United States Patent
Aubrey et al.

(10) Patent No.: US 12,123,178 B2
(45) Date of Patent: Oct. 22, 2024

(54) FLUID FLOW CONTROL SYSTEM

(71) Applicant: SMARTVALVE LIMITED, Lincoln (GB)

(72) Inventors: Paul Aubrey, Lincoln (GB); Andrew Talkes, Lincoln (GB)

(73) Assignee: SMARTVALVE LIMITED, Lincoln (GB)

( * ) Notice: Subject to any disclaimer, the term of this patent is extended or adjusted under 35 U.S.C. 154(b) by 424 days.

(21) Appl. No.: 17/608,634

(22) PCT Filed: May 14, 2020

(86) PCT No.: PCT/GB2020/051183
§ 371 (c)(1),
(2) Date: Nov. 3, 2021

(87) PCT Pub. No.: WO2020/229833
PCT Pub. Date: Nov. 19, 2020

(65) Prior Publication Data
US 2022/0220712 A1     Jul. 14, 2022

(30) Foreign Application Priority Data

May 14, 2019 (GB) ..................................... 1906785

(51) Int. Cl.
*F16K 37/00*     (2006.01)
*E03B 7/02*     (2006.01)
(Continued)

(52) U.S. Cl.
CPC ................ *E03B 7/075* (2013.01); *E03B 7/02* (2013.01); *F16K 37/0041* (2013.01); *G08B 21/182* (2013.01); *G08B 3/10* (2013.01)

(58) Field of Classification Search
CPC ........ E03B 7/075; E03B 7/02; F16K 37/0041; G08B 21/182; G08B 3/10
See application file for complete search history.

(56) References Cited

U.S. PATENT DOCUMENTS 7,415,376 B1 * 8/2008 Hurley ................ F16K 37/0091
702/182
10,161,539 B1    12/2018 Lin
(Continued)

FOREIGN PATENT DOCUMENTS

GB     2571520 A     9/2019
JP     2016125616     7/2016
(Continued)

OTHER PUBLICATIONS

International Search Report, International Patent application No. PCT/GB2020/051183 (Sep. 28, 2020).
(Continued)

*Primary Examiner* — Gary Collins
(74) *Attorney, Agent, or Firm* — Finch & Maloney PLLC (57) ABSTRACT

A system for monitoring and controlling a fluid flow network has a plurality of flow control valves, each operable manually by a removable key engageable with a valve spindle. The system includes a database that records the location of the valve and a turn profile for each valve in the network. A mobile communications device detachably mounted on the key transmits data to the database and receives data from the database, and includes orientation means with at least one of a gyroscope, an accelerometer, a compass, and a processor. The processor is controlled by a software program to (i) communicate with the central database and to receive characteristics for the valve at the transmitted position, (ii) receive signals from the orientation means and calculate the instantaneous rotational speed of the valve spindle and its amount of rotation, and (iii) control rotation of the valve spindle.

19 Claims, 5 Drawing Sheets

(51) Int. Cl.
*E03B 7/07* (2006.01)
*G08B 21/18* (2006.01)
*G08B 3/10* (2006.01)

(56) References Cited

U.S. PATENT DOCUMENTS

| | | | |
|---|---|---|---|
| 2013/0314239 A1* | 11/2013 | Clark | E03B 7/08 |
| | | | 340/686.1 |
| 2018/0176084 A1* | 6/2018 | McNab | H04L 67/10 |
| 2020/0232832 A1* | 7/2020 | Burke | H04B 5/70 |
| 2020/0299941 A1* | 9/2020 | Veros | G10L 15/22 |
| 2021/0123543 A1* | 4/2021 | Inoue | G05B 23/02 |

FOREIGN PATENT DOCUMENTS

| | | |
|---|---|---|
| KR | 101999777 B1 | 7/2019 |
| WO | 2015074763 A1 | 5/2015 |

OTHER PUBLICATIONS

Written Opinion, International Patent application No. PCT/GB2020/051183 (Sep. 28, 2020).
Great Britain Search Report, International Patent application No. PCT/EP2020/061094 (Nov. 13, 2019).

\* cited by examiner

FLUID FLOW CONTROL SYSTEM

FIELD OF THE INVENTION

This invention relates to the monitoring and control of fluid flow systems and in particular to fluid distribution networks such as for water or gas.

BACKGROUND TO THE INVENTION

In complex fluid distribution networks such as domestic water supplies, control is typically by means of manually-operated flow valves installed at remote locations around the network to regulate the flow and to permit sections of the network to be isolated for maintenance. To operate the valves, workers have to travel to the valve location and operate the valve using a key, typically in the form of a long shaft with a socket at one end to engage the valve spigot and with a (typically removable) cross bar at the other end by which the shaft is rotated.

The operation of the valves requires care: if closed or opened too quickly, transient pressure waves can be set up in the pipeline which can cause damage within the network, giving rise to leaks or pipe failure causing release of the water under pressure. Typically, these transient pressure waves occur as the valve first begins to open, or as it approaches the fully closed position, with greater care in the operation of the valve therefore being required during the first 20% of its opening movement or the final 20% of its closing movement.

Currently, the workers operating the valves require thorough training to ensure that the valves are operated in a manner that minimises the risk of transient pressure waves being established in the network, but this cannot ensure that every valve is operated in the best way according to the particular characteristics of the valve and its location in the network, and leaks and bursts still arise after valve operation, costing the industry large sums of money every year for repairs in addition to the cost of the water wasted.

Utility companies will typically operate a Graphical Information System (GIS) mapping the layout of their network and the components in it. There have been attempts to provide information for use with such systems as to the operation of valves by mounting on a valve a device for mechanically detecting rotation of the valve stem and for transmitting the information to the central database holder using a built in transmitter via the mobile telephone network. The information provided by such units is limited and the cost of providing and operating such units on every valve in the network would be prohibitively high.

SUMMARY OF THE INVENTION

Accordingly, the present invention provides a system for monitoring and controlling a fluid flow network having a plurality of flow control valves, the system comprising:
  a central database recording for each valve in the network the location of the valve, and a turn profile for the valve consisting of
    the number of rotations of the valve spindle between fully open and fully closed,
    an optimum rotation speed profile for opening and closing the valve;
  a removable key for operating the valves; and
  a mobile communications device associated with the key, the mobile communications device comprising
    a transmitter/receiver for transmitting data to the central database and for receiving data from the central database
    orientation means responsive to rotation of the valve spindle
    a processor controlled by a software program to
      communicate with the central database and to receive therefrom characteristics for the valve at the transmitted position,
      receive signals from the orientation means when the communications device is mounted on the key and to calculate therefrom the instantaneous rotational speed of the valve spindle and the amount of rotation of the valve spindle, and
      control rotation of the valve spindle in accordance with the optimum speed profile included in the received characteristics.

The key may be a manually-rotatable key and the mobile communications device is detachably mountable on the key, and wherein the orientation means consists of at least one of a gyroscope, an accelerometer and a compass, the processor being controlled by the software program to control rotation by generating a warning is the instantaneous rotational speed exceeds that in the optimum speed profile, and generating an indication when the required number of turns has been performed.

Preferably, the generated warning is an audible warning. The generated indication is also preferably an audible indication, but in both cases a visual indication may be given, for example via a display screen in the mobile communications device in addition to, or instead of, the audible indication.

The mobile communications device is suitably a smartphone, although it could be a dedicated device.

The key may be provided with a mounting for receiving the mobile communications device.

The mounting may be of the type comprising a first part attached to the key and a second part attached to the mobile communications device, the first and second parts being co-operable to mount the mobile communications device on the key.

Alternatively, the key may be a mobile valve actuator including drive means for driving the rotation of the valve spindle, the processor being controlled by the software program to control operation of the drive means.

The processor is preferably further programmed to transmit to the central database data representing the measured rotational speeds and amount of rotation.

The mobile communications device preferably comprises a positioning system receiver (for example GPS) configured to receive signals from a plurality of remote positioning transmitters and to calculate from the received signals the geographic position of the device and record the geographic position of the device at the valve.

The mobile communication device may be configured to record in a NFC tag attached to the valve data representing the measured rotational speeds and amount of rotation.

In one embodiment of the invention, the flow network includes fluid pressure loggers configured to transmit to the central database fluid pressure measurements and the central database is configured to relate pressure changes to operation of a valve within the network and to adjust the optimum rotation speed profile if the pressure changes exceed a predetermined value.

Benefits of the system of the invention include the elimination of leaks and bursts from transient pressure waves caused by improper operation of valves, as a result of better training of workers and the provision of more accurate network information. The system also provides real-time awareness of the fluid network status with data that are updated live as operations are performed.

BRIEF DESCRIPTION OF THE DRAWINGS

In the drawings, which illustrate embodiments of the invention.

DETAILED DESCRIPTION OF THE ILLUSTRATED EMBODIMENT

Figure 1:
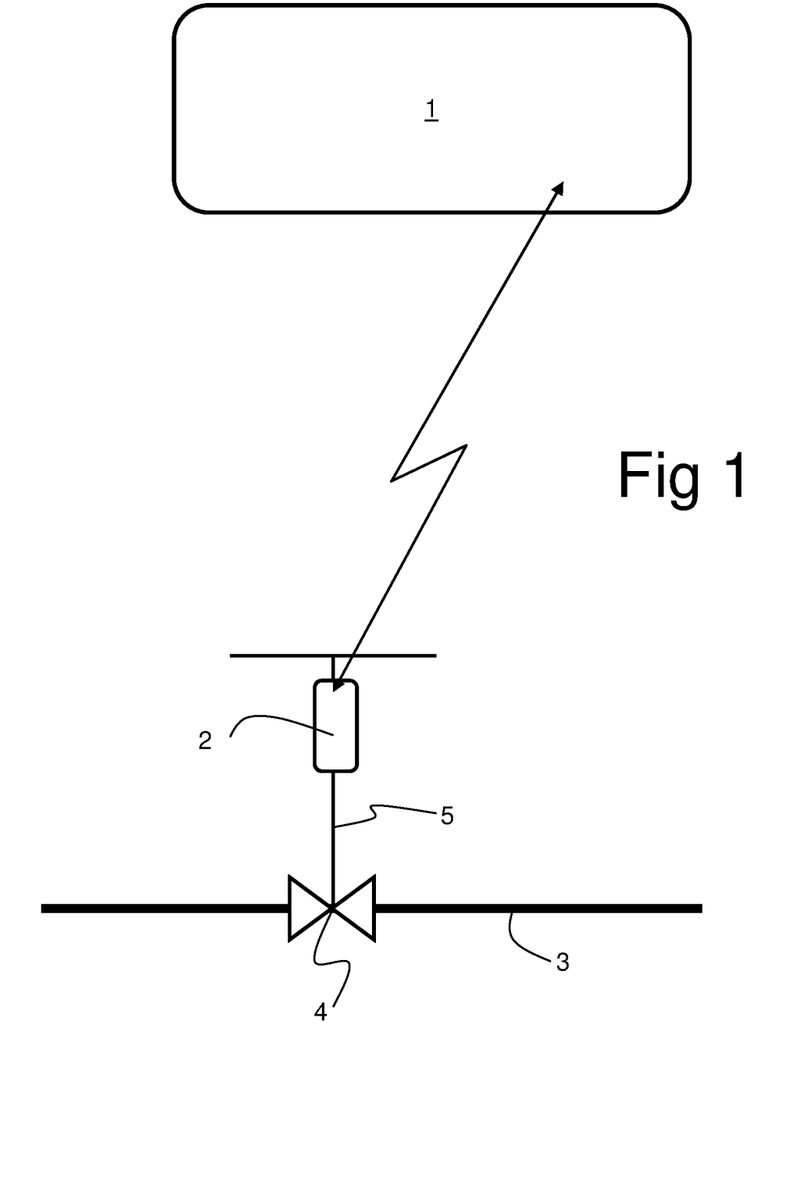
FIG. 1 is a diagrammatic representation of the system of the invention.

Referring first to FIGS. 1, a central control 1 is in data communication, for example by the public mobile telephone network, with a plurality of mobile communication devices 2 carried by technicians working to control the fluid flow network, for example the drinking water network. The mobile communication devices 2 are suitably in the form of smartphones, and are provided with software apps which link to the smartphones' orientation sensors. Typically, a smartphone is provided with internal sensors such as a gyroscope, a compass and an accelerometer, which can be used for example to sense the orientation of the smartphone to enable such functions as orientating the screen display according to the orientation of the smartphone. Different smartphones will be provided with different combinations of these types of sensor.

The drinking water network will include pipes 3 and flow control valves 4 which are distributed around the network and are therefore typically remote from the central control 1. Operation of the valves, for example for such operations as flushing pipework or closing off sections of the network for maintenance/pipe replacement, involves despatching technicians to the valve locations with a valve key 5, which will typically consist of a shaft with a socket formation at one end to engage with a typically square or hexagonal formation on the end of the valve spigot. The other end of the shaft has an eye through which a cross-bar can the inserted to facilitate rotation of the shaft. The shaft of the valve key 5 carries a mount for temporary attachment of a smartphone 6.

Figure 2:
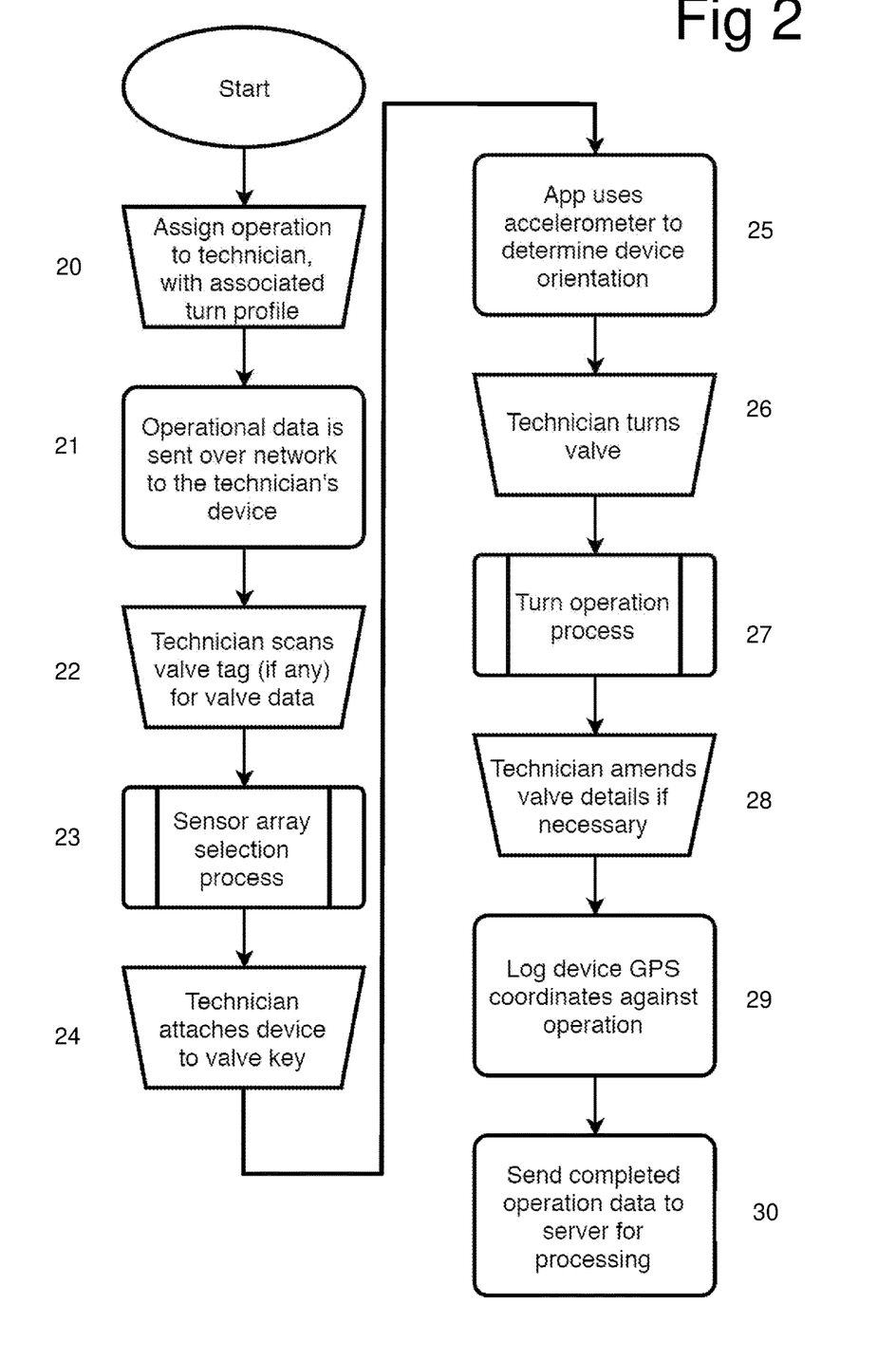
FIG. 2 illustrates the system workflow.

FIGS. 2a and 2b illustrate a typical workflow. At the start of the procedure, the central control 1 assigns the operation to a technician (step 20), transmitting the operational data, including the turn profile, to the technician's smartphone (step 21).

On arrival at the valve to be operated, the technician uses his smartphone to scan an identity tag on the valve (if there is one—see the description hereinafter with reference to FIG. 5). This can enable the valve identity to be confirmed to the central control and proves that the valve has been visited by the technician (step 22). The app then causes the smartphone to run the sensor array step, explained in more detail hereinafter with reference to FIG. 4 (step 23), after which the technician attaches the smartphone to the valve key 5, for example using a two-part quick mount having one part mounted on the valve key and the other part on the smartphone, the two parts being engageable one with the other to effect mounting (step 24).

The app uses the accelerometer signals in the smartphone to determine the orientation of the smartphone, prior to the turning operation (step 25).

The technician then turns the valve (step 26), the turn operation process (step 27) as described hereinafter with reference to FIG. 3 being performed by the app. The technician then amends the valve details at step 28, if this is different to the current GIS entry. For example, valve diameter and orientation may differ from that recorded in the GIS, and it is very important that this be shown correctly. The app then logs the GPS (Global Positioning System) co-ordinates for the location generated within the smartphone against the operation at step 29 and transmits the completed operation data to the central control for processing at step 30.

At the central control, a server processes the operation data received from the technician's smartphone through the app to present rotation data for the valve in a graphical format to management and technicians and to flag any issues with recorded rotation data for review, for example exceeding the maximum set speed, or performing a different number of turns from the expected amount. This allows for example direct comparison of rotation data for similar operations, to aid in training, and to use recorded data to amend valve data if it is determined that the valve data was initially incorrect. Logged rotation data can also be used to update the valve's open/closed status in the GIS used in the central control, which can flag valves whose status does not match the expected status after a set of operations, as well as providing an overview of valves statuses over a large geographic region.

The GPS co-ordinates provided in step 29 enable the valve location data in the GIS to be updated—it is not uncommon for there to be errors, leading to problems in, for example, identifying accurately the layout of the pipe network for the purposes of construction work. The updated valve location can be displayed on a map, relative to other valves in the "District Metered Area".

Figure 3:
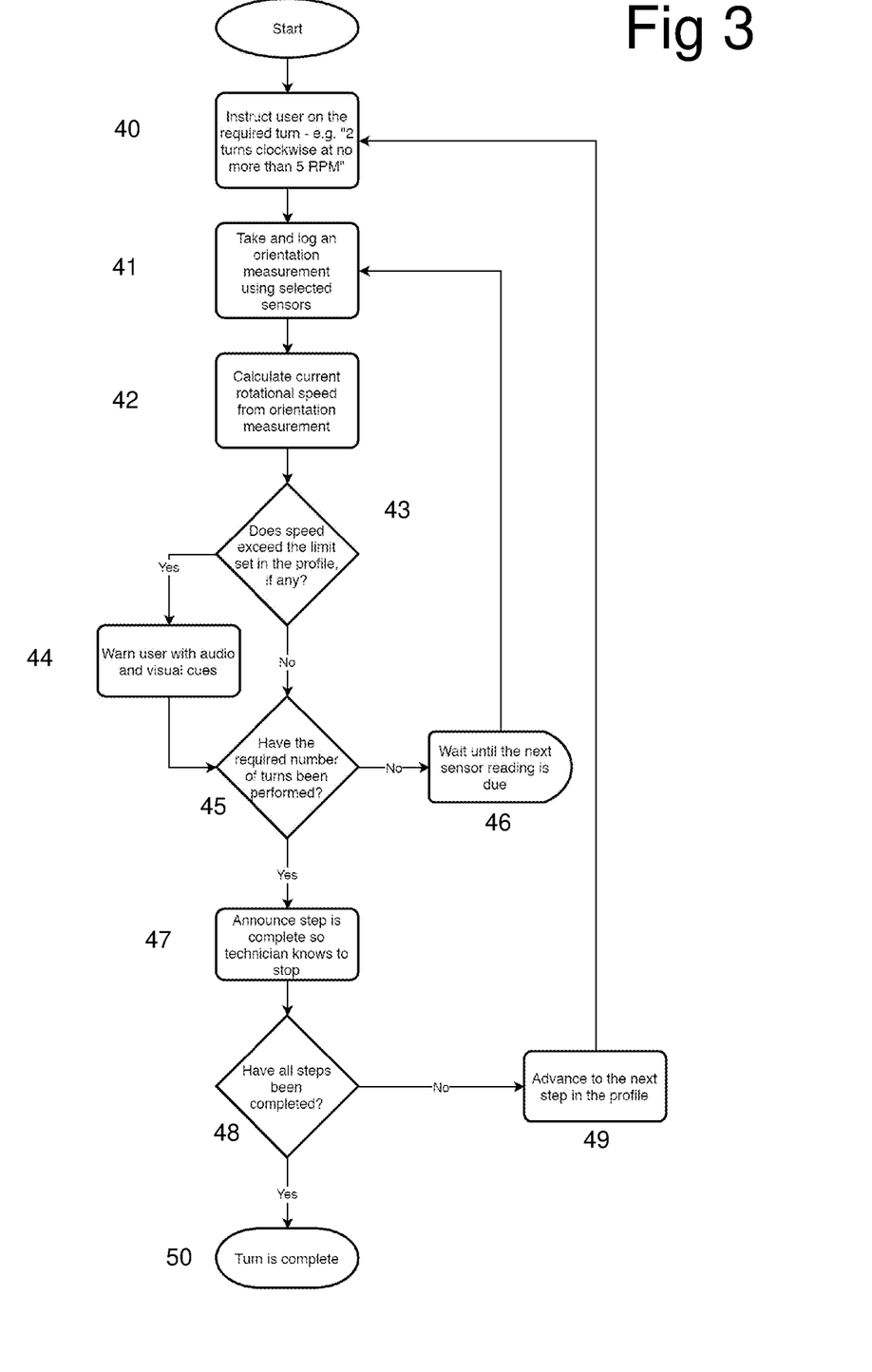
FIG. 3 illustrates the turn operation process.

Referring now to FIG. 3, the turn operation process (step 27 in FIG. 2) of the app first instructs the technician (step 40) on the required turn for the valve for the first step in the profile received, for example "Two turns clockwise at no more than 5 RPM". This instruction may simply be displayed on the screen of the smartphone or it may alternatively or additionally be presented as an audible message via the smartphone loudspeaker. The orientation of the smartphone mounted on the key 5 is determined using selected sensors in the smartphone and this is logged (step 41). As the key is rotated, the instantaneous rotational speed is calculated from the change with time of the orientation measurement (step 42) and this is compared (43) with the received profile for the valve. If the speed exceeds the limit set in the profile (if any), then a warning is generated to alert the technician, by way of visible and/or audible indications (step 44). The next step determines whether the required number of turns set in step 40 have been performed (45). If not, the app moves to step 46, where a delay is imposed until the next sensor reading is due at step 41. It will be appreciated that in practice the delay between measurements will be small enough to record an accurate profile of speed against time without imposing an undue burden on the processor of the smartphone. Typically, the delay between successive measurements will be such that the reading is taken every 15 milliseconds. This rate has been found to be optimal with current equipment, but the rate can be configured to different rates. For example, as technology in smartphones improves, it may be possible to reduce the interval to improve the real-time delivery of information to the user, ensuring that the control of the valve is of even higher accuracy.

When the correct number of turns have been performed, the app will provide an announcement to the technician to stop (47. This will typically be an audible instruction, although it could be additionally or alternatively be a visual warning via the smartphone screen for example. The app will then check (48) whether all the steps in the profile have been completed and if not will return (49) to step 40, where the next step in the profile is announced. When all the steps in the profile are complete the app will move to the completion step 50, advising the technician of this by an audible and/or visual notification.

Figure 4:
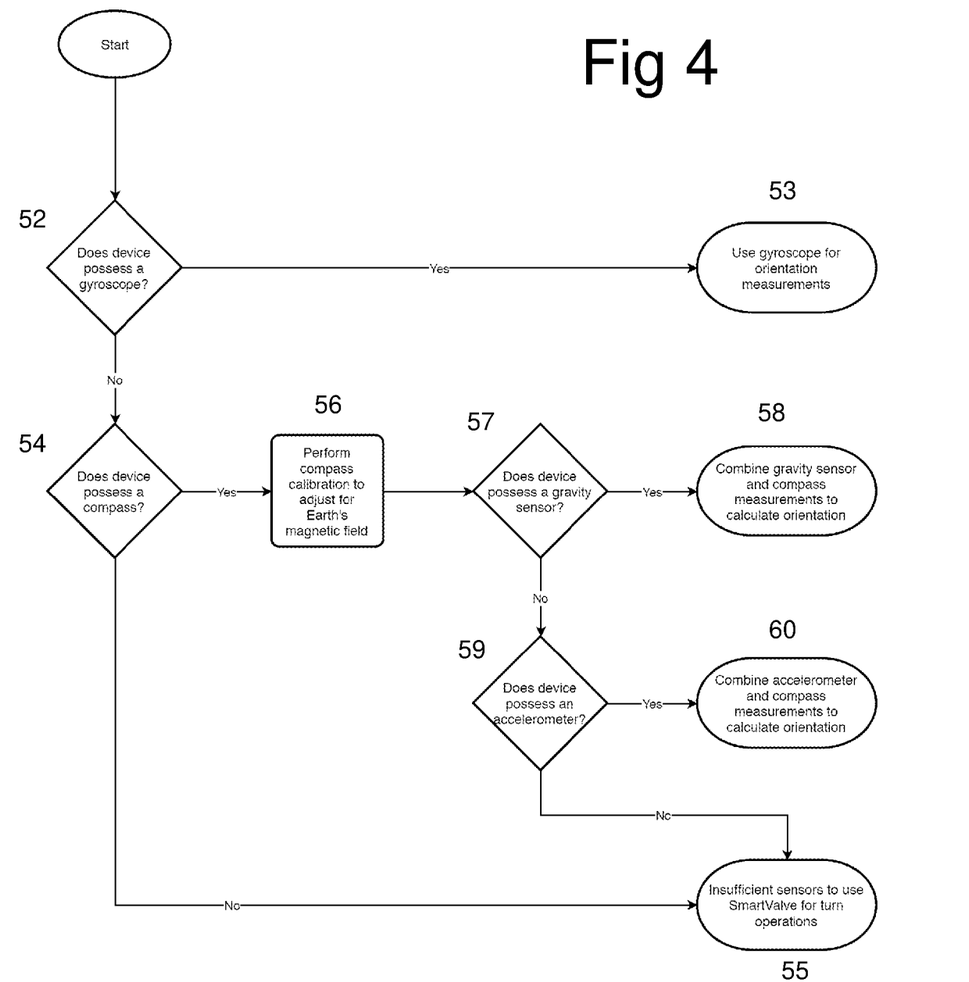
FIG. 4 illustrates the sensor array selection process.

FIG. 4 shows the sensor array selection process. While the app will, by default select a sensor array to use for orientation measurements, based on the smartphone or other device's available hardware, according to the flowchart shown in the Figure, the technician will be free to override this setting as appropriate. For example, when using a steel key, the technician would avoid using the compass because the steel of the valve key would interfere with the compass readings.

The first stage 52 in this process checks whether the device (smartphone for example) possesses a gyroscope and if it does this will be selected (step 53) for use in orientation measurements. If not, the app will check (54) for the presence of a compass in the device. If this is not present, the app moves to step 55, reporting to the user that insufficient sensors are available for performance of the app. Assuming the compass is detected at step 54, the app moves to a compass calibration step 56 to adjust for variations in the Earth's magnetic field. The app then checks (57) for the presence of a gravity sensor. If this is detected, the combination of gravity sensor and compass will be used to calculate orientation (58). If the gravity sensor is not detected, the next step in the app (59) checks for the presence of an accelerometer and if this is detected the app will use the combination of accelerometer and compass to measure orientation (60). If the accelerometer is not detected, the app moves to step 55, reporting that the app cannot be used.

Figure 5:
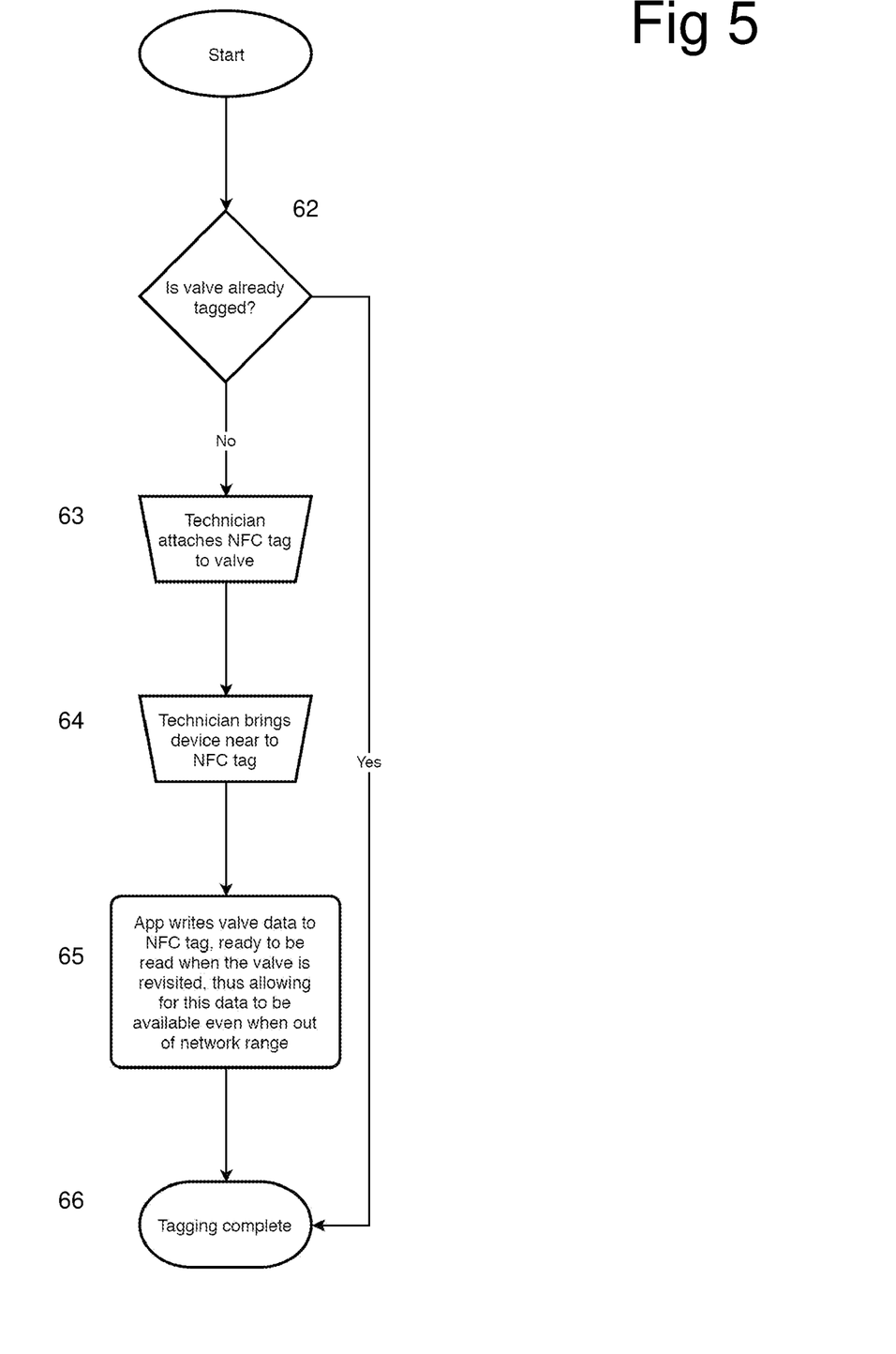
FIG. 5 illustrates the tagging workflow.

FIG. 5 illustrates an optional feature of the app, by which the valve can be tagged with relevant data for future valve operations. The first step 62 is to determine whether the valve is already tagged. This will typically involve a visual inspection of the valve by the technician, although it might alternatively involve using the NFC (Near Field Communication) ability of the smartphone to try to detect an existing tag. Step 22 of the process (FIG. 2) does this. If the valve is already tagged, no further step is required and the app moves to the final step 66. Assuming that there is no existing tag, the technician will attach one to the valve (63) and then bring the smartphone into proximity with the tag (64). The app will then write to the tag data ready to be read when the valve is revisited, thus allowing for this data to be available even when out of network range (65).

Water companies routinely monitor pressure within a water distribution network. The pressures are recorded by pressure loggers which dial into the water company's network and transmit the pressure readings at regular intervals. In one embodiment of the monitoring system the pressure data readings are recorded in the central database and analysed on a District Metered Area (DMA) basis. Where there have been valve operations on a DMA which has pressure readings, the system can match these and bring the data sets together. This has a number of purposes:

Match pressure fluctuations to a specific valve turn or group of valve turns;

Identify if the valve operation was carried out in accordance with the current calm network policy and that it matched the required valve turn profile;

If the valve turn was not carried out to the required standard and pressure detected the system will automatically alert operational control of the issue and flag the DMA to be in "watch" mode for leaks, bursts and water discolouration incidents;

If the valve turn was to the required standard and pressure was detected then the system of the invention will automatically alter the valve turn profiles for that valve, adjacent and connected valves. The DMA will be placed in watch mode for leaks, bursts and water discolouration and all valve turns on the DMA flagged for monitoring by operational control In achieving these outcomes the system of the invention is creating dynamic turn profiles based on the Hydraulic model within each DME. This creates a level of sophistication not currently in operation in any water company on a global scale.

Some manual valves require a large number of turns to open or close them, others require more force to operate due to the valve being seized. In these cases, mobile actuators are often used to complete the valve turn. The system of the invention may be configured to communicate with the controller of the actuator to send the desired network turn profile to the actuator. The system also receives the information from the actuator regarding the turn, speed, direction number of turns and torque.

The invention claimed is:

1. A system for monitoring and controlling a fluid flow network having a plurality of flow control valves, each operable manually by a removable key engageable with a valve spindle, the system comprising:
 a central database recording for each valve in the fluid flow network the location of the valve, and a turn profile for the valve consisting of
  a number of rotations of the valve spindle between fully open and fully closed,
  an optimum rotation speed profile for opening and closing the valve;
 a removable key for operating the valves; and
 a mobile communications device associated with the key, the mobile communications device comprising
  a transmitter/receiver for transmitting data to the central database and for receiving data from the central database,
  orientation means responsive to rotation of the valve spindle,
  a processor controlled by a software program to
   communicate with the central database and to receive therefrom characteristics for the valve at the transmitted position,
   receive signals from the orientation means when the communications device is mounted on the key and to calculate therefrom an instantaneous rotational speed of the valve spindle and an amount of rotation of the valve spindle, and
   control rotation of the valve spindle in accordance with the optimum rotation speed profile included in the received characteristics for the valve;
 wherein the removable key is a manually-rotatable key and the mobile communications device is detachably mountable on the key; and
 wherein the processor is programmed to control rotation by generating a warning when the instantaneous rotational speed exceeds a rotational speed value in the optimum rotation speed profile, and programmed to generate an indication when the required number of turns of the valve spindle has been performed.

2. The system according to claim 1, wherein the orientation means consists of at least one of a gyroscope, an accelerometer and a compass.

3. The system according to claim 1, wherein the generated warning is an audible warning.

4. The system according to claim 1, wherein the indication is an audible indication.

5. The system according to claim 1, wherein the mobile communications device is a smartphone.

6. The system according to claim 1, wherein the key is provided with a mounting for receiving the mobile communications device.

7. The system according to claim 6, wherein the mounting comprises a first part attached to the key and a second part attached to the mobile communications device, the first and second parts being co-operable to mount the mobile communications device on the key.

8. The system according to claim 1, wherein the key is a mobile valve actuator including drive means for driving the rotation of the valve spindle, and wherein the processor is further programmed to control operation of the drive means.

9. The system according to claim 1, wherein the processor is further programmed to transmit to the central database data representing the measured rotational speeds and amount of rotation.

10. The system according to claim 1, wherein the mobile communications device comprises a positioning system receiver configured to receive signals from a plurality of remote positioning transmitters and to calculate from the received signals the geographic position of the device and record the geographic position of the device at the valve.

11. The system according to claim 1, wherein the mobile communication device is configured to record in a NFC tag attached to the valve data representing the measured rotational speeds and amount of rotation.

12. The system according to claim 1, wherein the flow network includes fluid pressure loggers configured to transmit to the central database fluid pressure measurements and the central database is configured to relate pressure changes to operation of a valve within the network and to adjust the optimum rotation speed profile if the pressure changes exceed a predetermined value.

13. The system according to claim 1, wherein the processor is further programmed to generate a warning if the instantaneous rotational speed exceeds a rotational speed value in the optimum rotation speed profile.

14. The system according to claim 1, wherein each of the generated indication and the generated warning comprises at least one of an audible indication and a visual indication via a mobile communications device.

15. The system according to claim 14, wherein the mobile communications device is a smartphone.

16. A system for monitoring and controlling a fluid flow network having a plurality of flow control valves, each operable manually by a removable key engageable with a valve spindle, the system comprising:
a central database recording for each valve in the fluid flow network a location of the valve and a turn profile for the valve consisting of
a number of rotations of the valve spindle between fully open and fully closed,
an optimum rotation speed profile for opening and closing the valve;
a removable key for operating the valves; and
a mobile communications device associated with the key, the mobile communications device comprising
a transmitter/receiver for transmitting data to the central database and for receiving data from the central database,
orientation means responsive to rotation of the valve spindle,
a processor controlled by a software program to
communicate with the central database and to receive therefrom characteristics for the valve at the transmitted position,
receive signals from the orientation means when the communications device is mounted on the key and to calculate therefrom an instantaneous rotational speed of the valve spindle and an amount of rotation of the valve spindle, and
control rotation of the valve spindle in accordance with the optimum rotation speed profile included in the received characteristics for the valve;
wherein the mobile communications device is detachably mounted on the removable key.

17. The system according to claim 16, wherein the orientation means comprises at least one of a gyroscope, an accelerometer, and a compass.

18. The system according to claim 17, wherein the processor is configured to generate a warning if the instantaneous rotational speed exceeds a rotational speed value in the optimum rotation speed profile, and configured to generate an indication when the required number of turns has been performed.

19. The system according to claim 18, wherein the fluid flow network includes fluid pressure loggers configured to transmit to the central database fluid pressure measurements, and wherein the central database is configured to relate pressure changes to operation of a valve within the fluid flow network and to adjust the optimum rotation speed profile if the pressure changes exceed a predetermined value.

* * * * *